United States Patent [19]

Kanda et al.

[11] Patent Number: 4,740,055
[45] Date of Patent: Apr. 26, 1988

[54] COATED OPTICAL FIBERS

[75] Inventors: Kazunori Kanda, Yao; Ryuzo Mizuguchi, Yawata, both of Japan

[73] Assignee: Nippon Paint Co., Ltd., Osaka, Japan

[21] Appl. No.: 839,001

[22] Filed: Mar. 12, 1986

[30] Foreign Application Priority Data

Mar. 15, 1985 [JP] Japan .................................. 60-052910

[51] Int. Cl.$^4$ ................................................ G02B 6/10
[52] U.S. Cl. ............................. 350/96.30; 350/96.23; 350/96.34
[58] Field of Search ................. 350/96.34, 96.23, 96.3, 350/96.29

[56] References Cited

U.S. PATENT DOCUMENTS

| | | | |
|---|---|---|---|
| 4,322,324 | 3/1982 | Mizuguchi et al. | 528/290 |
| 4,379,872 | 4/1983 | Ishikura et al. | 523/406 |
| 4,629,286 | 12/1986 | Fuse et al. | 350/96.23 |

*Primary Examiner*—William L. Sikes
*Assistant Examiner*—Frank González
*Attorney, Agent, or Firm*—Millen & White

[57] ABSTRACT

Coated optical fibers surrounded by a protective coating film comprising a continuous phase of film-forming matrix resin and polymer microparticles of a polymer of ethylenically unsaturated polymerizable monomers.

12 Claims, No Drawings

COATED OPTICAL FIBERS

BACKGROUND OF THE INVENTION

This invention relates to coated optical fibers and to a method of coating optical fibers.

Optical fibers are conventionally coated with a protective coating composition immediately after their drawing. This coating is necessary not only for preventing the fiber from being scratched during subsequent steps but also for protecting the fiber from deteriorative environment and microbending that produces loss of signal transmission.

Since it is difficult for a single layered coating to comply with all requisite properties, it is conventional and commercial practice to provide a multi-layered structure composed of layers having different roles. For example, the primary coating layer directly surrounding the cladding of the fiber is required to have lower Young's modulus, higher elongation and higher refractive index, while the secondary or outer layer is required to have higher toughness and higher abrasion resistance.

In order to meet these requirements, numerous attempts have been made to improve the material employed as the coating film but these all have proven unsatisfactory.

Besides, as the fiber-drawing speed has become more rapid in recent years, needs exist for such a coating composition having a shorter curing time. To this end, radiation, curable compositions are attractive. Usually these compositions, as opposed from thermosetting compositions, do not contain any volatile solvent so as to obviate its evaporation or film setting by heat. It is, therefore, difficult to control the workability of these solvent-free compositions.

We have found that various performance characteristics of coating films applied on optical fibers may be significantly improved by incorporating polymer microparticles to the compositions used for the stated purposes. The polymer microparticles may also improve the workability of the radiation curable, solvent-free compositions.

BRIEF SUMMARY OF THE INVENTION

According to the present invention, there is provided an optical fiber surrounded by a coating film comprising a continuous phase of a film-forming matrix resin and polymer microparticles having a particle size from 0.01 to 6 microns uniformly dispersed in said matrix resin.

Preferably, the polymer microparticles consists of internally cross-linked polymer of ethylenically unsaturated polymerizable monomers and are present in said film in amounts from 0.02 to 40% by weight thereof.

The polymer microparticles may be incorporated into a primary or secondary layer or both if the coating is multi-layered.

The coating film of the present invention may be formed by applying a normally liquid coating composition containing the polymer microparticles onto the optical fiber and curing the composition. The normally liquid coating composition may be either of thermosetting type or radiation curable type. In case of outermost coating film, normally solid thermoplastic compositions containing the polymer particles may be coated by extrusion or like methods.

The coating film of this invention may exhibit improved physical properties over the corresponding film free from the polymer microparticles. For instance, by incorporating the polymer microparticles into the primary coating layer, it is possible to balance between the Young's modulus and the elongation as desired over a wide temperature range due to an interaction between the polymer microparticles and the matrix resin. It is also possible to increase the refraction index of the primary coating layer by incorporating polymer microparticles having higher refraction index. When the primary coating layer is formed of silicone-based resins, the presence of polymer microparticles may improve the peelability of the coating as is necessary for connecting fibers.

When incorporated into the secondary coating layer, the polymer microparticles may increase the toughness and strength of the film owing to an interaction between the polymer microparticles and the matrix resin. The addition of hard polymer microparticles may improve the abrasion resistance of the secondary coating layer.

In case of normally liquid, thermosetting or radiation curable coating compositions, their viscosity may be controlled to exhibit a yield value by incorporating the polymer particles thereto. This enables the compositions to be applied in a greater film thickness by a single coating operation without run due to the gravity flow, while retaining a proper workability.

The coating films containing polymer microparticles formed around the optical fiber may serve to relax stress when applied externally due to a physico-chemical interaction between the polymer microparticles and the matrix resin based on pseudo-network principle. This relaxation of stress serves to prevent microbending from occurring and resultant decreased loss of signal transmission.

DETAILED DESCRIPTION OF THE INVENTION

Internally cross-linked polymer microparticles are used in the paint industry to prepare high solid content paints without compromising their workability.

Several methods are known for preparing such polymer microparticles. One method includes the steps of emulsion polymerizing a mixture of ethylenically unsaturated monomers in an aqueous medium, and removing water from the emulsion by means of solvent substitution, azeotropic distillation, centrifugation, drying and the like. Although any conventional emulsifier may be used, ampho-ionic group-containing, water-soluble resins as disclosed in Japanese Laid Open Patent Application No. 58-129066 are preferable. Ampho-ionic group-containing alkyd resins disclosed in U.S. Pat. No. 4,322,324 and amphoteric amino sulfonate derivatives of epoxy resins disclosed in U.S. Pat. No. 4,379,872 may advantageously be employed.

Another method commonly referred to as the non-aqueous dispersion (NAD) method or precipitation polymerization method comprises polymerizing a mixture of ethylenically unsaturated monomers in a non-aqueous organic liquid such as aliphatic hydrocarbons or solvents having high solubility parameters in which the monomer mixture is soluble but the polymer is insoluble. Conventional suspension or bulk polymerization methods may also be employed.

The polymer microparticles used in the present invention may be prepared by any of these known methods provided that they have an average particle size of 0.01 to 6 microns for retaining good dispersibility, reactivity and stability.

Examples of ethylenically unsaturated comonomers used for the production of microparticles include methyl (meth)acrylate, ethyl (meth)acrylate, n-butyl (meth)acrylate, isobutyl (meth)acrylate, 2-ethylhexyl (meth)acrylate, styrene, α-methylstyrene, vinyltoluene, t-butylstyrene, ethylene, propylene, vinyl acetate, vinyl propionate, acrylonitrile, methacrylonitrile, dimethylaminoethyl (meth) acrylate and the like. Two or more comonomers may be combined.

The starting monomer mixture preferably contains, at least as a portion thereof, a monomer having at least two polymerizable sites per molecule or a combination of two monomers having mutually reactive groups to give microparticles which are internally cross-linked.

Cross-linking comonomers include a monomer having at least two ethylenically unsaturated bonds per molecule and the combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalate and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid. Other examples of the combination of mutually reactive groups include amine/carbonyl, epoxide/carboxylic acid anhydride, alkyleneimine/carbonyl, amine/carboxylic acid chloride, organo-alkoxysilane/carboxyl and hydroxyl/isocyanate.

Polymer microparticles prepared in an aqueous or non-aqueous medium may be isolated by such conventional means as filtration, spray drying, lyophilization and the like, and used directly or after milling to a suitable particle size. Alternatively, the dispersion containing the microgel particles may be subjected to solvent substitution and the resulting dispersion in a new medium may be incorporated in the composition of this invention.

The average size of polymer microparticles varies with the particular polymerization method. Thus, the emulsion polymerization and NAD methods are suitable for the range of 0.01 to 0.6 micron size, the precipitation polymerization method is suitable for the range of 0.2 to 2 micron size, and the suspension or bulk polymerization methods are suitable for the range of 1 to 6 microns size. The polymeric microparticles used in the present invention may be prepared by any of these known methods.

The particle size distribution of polymer microparticles may be regulated by the selection of polymerization method or by suitably mixing particles having different average particles sizes to achieve optimum rheology control of the composition containing them. Furthermore, the physico-chemical properties of polymer microparticles such as glass transition temperature and solubility parameter, refractive index may be controlled as desired by suitably selecting their monomeric fomulations. Polymer microparticles having on their surfaces functional or unsaturated groups capable of co-reacting with such groups possesed by other polymer microparticles or the matrix resin may be incorporated to enhance the interaction between the polymer microparticles themselves or with the matrix resin. The polymer microparticles may also carry on their surfaces or interior a substance which promotes the radiation polymerization reaction such as photosensitizers or a substance which improves properties of cured composition such as stabilizers.

The proportion of polymer microparticles in the coating composition generally ranges from 0.02 to 40%, preferably 0.1 to 30 %, more preferably at least 1% by weight. Exessive use may adversely affect the workability of the resulting composition.

In order to decrease loss of signal transmission caused by fiber microbending, it is desirable for the polymer microparticles in the primary coating layer to have an average particle size less than 0.4 microns, preferably less that 0.2 microns, more preferably 0.15 microns. The particle size of polymer particles used in the secondary or outer coating layer may range from 0.01 to 6 microns.

Various liquid coating compositions are known for forming primary and secondary coating film layers on optical fibers. Normally solid thermoplastic resins are used as materials for the outermost or sheath layers. These known compositions and materials may be used as matrix resins in which polymer microparticles are dispersed.

Examples of film-forming resins used in the primary or secondary coating layer include silicone resins, polyether resins, polyester resins, unsaturated polyester resins, epoxy resins, polyurethane resins, acrylic resins, aminoplast resins, polyamide resins, vinyl polymers, diene polymers and their blends. The liquid coating compositions containing these polymers may be either of the thermosetting type or radiation curable type. The thermosetting type compositions generally comprise an unsaturated oligomer, a polymerizable monomer and a polymerization initiator such as peroxide compounds and azo compounds. Compositions comprising two or more resins having functional groups which are mutually reactive upon heating as well as silicone resin-containing compositions are also of the thermosetting type.

Among typical thermosetting resins for coating optical fibers are silicone resins. They are conventionally prepared by reacting a polyorganosiloxane having a plurality of vinyl groups with a polyorganohydrogensiloxane in the presence of platinum or a platinum compound.

For use in primary coating layers, phenyl or other aromatic hydrocarbon groups are introduced into the siloxane in place of a portion of the methyl or vinyl groups to increase the refraction index of the resulting silicone resin.

As fibers are drawn at higher speeds in modern fiber drawing technology, it is highly preferable to use a radiation curable liquid composition as the matrix resin in the present invention.

Typical examples of high energy radiation curable resins are those referred to as photosensitive or photocurable resins. These resins consist of (a) film-forming polymers or oligomers capable (or incapable) of crosslinking through photochemical reactions, (b) photopolymerizable monomers or low molecular weight oligomers, (c) photo-polymerization initiators or photosensitizers, and (d) heat-polymerization inhibitors or stabilizers. The resins may optionally contain further ingredients such as photosensitizer enhancers, colorants and other additives as desired.

Examples of film-forming polymers or oligomers include unsaturated polyester resins, urethane acrylate resins, epoxy acrylate resins, polyester acrylate resins, spiran acrylate resins, polyether acrylate resins, silicone acrylate resins, polybutadiene acrylate resins, vinyl based acrylate resins and the like.

Examples of photo-polymerizable low molecular weight oligomers include low molecular weight oligomers of the above-named film-forming polymers or oligomers. Examples of photo-polymerizable monomers include styrene, vinyltoluene, divinylbenzene, vinyl acetate, (meth)acrylonitrile, esters of (meth)acrylic acid such as methyl (meth)acrylate, ethyl (meth)acrylate, butyl (meth)acrylate, 2-ethylhexyl (meth)acrylate, glycidyl (meth)acrylate, ethyleneglycol di-(meth)acrylate and trimethylolpropane tri-(meth)acrylate, diethyl itaconate, dibutyl itaconate, diethyl fumarate, diethyl maleate and the like.

Examples of photosensitizers includes benzoin, benzoin methyl ether, benzoin propyl ether, benzoin butyl ether, benzophenone, diacetyl, benzil, dibutyl disulfide, dibenzyl disulfide and the like.

Examples of heat-polymerization inhibitors include hydroquinone, t-butylhydroquinone, p-methoxyphenol, catechol, benzoquinone and the like.

Other radiation curable resins have similar compositions to the above-discussed photocurable resins except that they do not contain photosensitizers. Since these radiation curable resins are well-known in the art and do not constitute a part of the present invention, further explanation thereon will not be needed by those skilled in the art.

The coating compositions for coating optical fibers as primary or secondary coating according to the presention comprise a thermosetting or radiation curable liquid resin of the type as discussed herein, and the polymer microparticles dispersed in the liquid resin. They may be applied to optical fibers by any conventional method such as die-coating, spraying or dipping, and then cured by applying heat thereto or irradiating with high-energy radiation such as UV ray or electron beam. The coating film may be either single layered or the multi-layered depending upon the nature of matrix resin and polymer particles. However, since it is difficult for a single layered film to comply with all of the properties required for both primary and secondary coating layers, it is preferable to surround the fiber by a multi-layered film formed of a primary coating layer having lower Young's modulus and higher elongation, and a secondary coating layer having high toughness and high elongation.

It is required that the outermost layer be protective against external forces, particularly against abrasion. This may be accomplished, if the outermost layer is the secondary coating layer, by incorporating therein such polymer microparticles having higher hardness. Alternatively, the secondary coating layer may be overlaid with a coating of normally solid thermoplastic resins by extruding and like methods. Examples of such thermoplastic resins include polyamide, polyethylene, polypropylene, polyester, polysulfone, acrylic resins, methacrylic resins, polyvinyl chloride, polyphenylene oxide, polyphenylene sulfide, fluorocarbon resins and blends of these polymers. The polymer microparticles used in the present invention are also effective to improve the properties of these thermoplastic outermost coating layers. For examples, polymer microparticles having higher hardness may be incorporated into molten thermoplastic resins to increase their abrasion resistance.

The coating compositions may further contain conventional additives as desired such as fillers, e.g. colloidal silica or other extenders, colorants, stabilizers and the like.

The following examples are intended to illustrate the present invention in further detail. All parts and percents therein are by weight unless otherwise indicated.

EXAMPLE 1

Preparation of Ampho-Ionic Emulsifier

To a two liter flask having stirring means, a reflux condenser, temperature-control means, a nitrogen gas-introducing tube and a decanter were added 134 parts of N,N-bis-(hydroxyethyl)taurine, 130 parts of neopentyl glycol, 236 parts of azelaic acid, 186 parts of phthalic anhydride, and 27 parts of xylene. The mixture was refluxed and water was removed as an azeotropic mixture with xylene. The temperature was raised to 190° C. over 2 hours and the reaction was continued with stirring until an acid number of 145 was reached.

The reaction product was cooled to 140° C. and 314 parts of CARDURA E-10(glycidyl versatate, Shell Chemical Company) was added dropwise over 30 minutes at 140° C. The reaction was continued for additional two hours with stirring. A polyester resin having an acid number of 59, a hydroxyl number of 90 and a number average molecular weight ($\overline{Mn}$) of 1054 was obtained.

EXAMPLE 2

Preparation of Polymer Microparticles (A)

To a one liter flask equipped with stirring means, cooling means and temperature-control means were added 380 parts of deionized water, 50 parts of the emulsifier resin prepared in Example 1 and 7 parts of dimethylethanolamine. The mixture was stirred at 80° C. to make a solution. To the solution was added a solution of 2.5 parts of azobiscyanovaleric acid in 50 parts of water containing 1.6 parts of dimethylethanolamine. Then a monomer mixture consisting of 118 parts of styrene, 118 parts of ethyleneglycol dimethacrylate and 14 parts of 2-hydroxyethyl acrylate was added dropwise over 90 minutes. Stirring was continued for additional 90 minutes to give a polymer microparticle dispersion having a nonvolatile content of 43% and an average particles size of 45 millimicrons. Polymer microparticles (A) were obtained by lyophilizing the resulting polymer dispersion.

EXAMPLE 3

Preparation of Polymer Microparticles (B)

The procedure of Example 2 was repeated except that ethylene glycol dimethacrylate was replaced with divinylbenzene. Polymer microparticles (B) were obtained.

EXAMPLE 4

Preparation of Polymer Microparticles (C)

A one liter flask equipped with stirring means, cooling means and temperature-control means was charged with 1000 parts of deionized water, 20 parts of polyvinyl alcohol (average M.W.=1500) and 10 parts of sodium dodecylbenzenesulfonate. The flask was purged with $N_2$ gas under stirring at 1000 rpm and the content was heated to 60° C. A mixture of 10 parts of styrene, 30 parts of methyl methacrylate, 10 parts of ethylene glycol dimethacrylate and 1 part of 2,2'-azobis-(2,4-dimethylvaleronitrile)(polymerization initiator sold by Wako Junyaku Co., Ltd., under the trade name of V-65) was added dropwise over one hour. After the addition, the inner temperature was raised to 70° C. and the reaction was continued for additional 5 hours under stirring to give a polymer microparticle dispersion. Polymer microparticles (C) were separated from the liquid medium by centrifugating the dispersion and washed with deionized water three times. The average particle size was 5.5 microns.

EXAMPLE 5

Preparation of Polymer Microparticles (D)

A one liter flask equipped with stirring means, cooling means and temperature-control means was charged with 900 parts of isopropyl alcohol and then heated to 50° C. while purging with $N_2$ gas. To the flask was added dropwise a mixture of 10 parts of styrene, 8 parts of methylemthacrylate, 5 parts of n-butyl acrylate, 2 parts of acrylic acid and 25 parts of ethylene glycol dimethacrylate. Then the mixture was stirred for 10 minutes. After adding 1 part of azobisisobutyronitrile, the inner temperature was gradually raised to 70° C. and the reaction was continued for 4 hours with stirring. The resulting white precipitate was filtered off, washed with isopropyl alcohol three times and dried in a vacuum oven to give polymer microparticles (D) having a particle size of 1.0 microns when measured on a scanning electron micrograph.

EXAMPLE 6

A one liter flask equipped with stirring means, cooling means and temperature-control means was charged with 17 parts of polymer microparticles (A) obtained in Example 2 and 70 parts of n-butyl acetate. The polymer microparticles were well dispersed by stirring the mixture for 90 minutes. Then 200 parts of polyoxypropylene glycol having a molecular weight of 2,000 and 44.4 parts of isophoronediisocyanate were added with stirring. After the addition of 0.25 parts of dibutyltin dilaurate, the reaction mixture was kept at 80° C. for 1 hour, and a mixture of 26 parts of 2-hydroxyethyl methacrylate and 0.27 parts of hydroquinone was added dropwise over 1 hour at 80° C. After holding for an additional 4 hours at the same temperature and after having confirmed the disappearance of NCO absorbance spectrometrically, the reaction product was distilled in vacuo to remove the n-butyl acetate solvent to obtain polyether urethane acrylate resin (A) containing polymer microparticles.

EXAMPLE 7

The procedure of Example 6 was repeated except that polymer microparticles (A) were not incorporated. Polyether urethane acrylate resin (B) (for comparison) was obtained.

EXAMPLE 8

The procedure of Example 6 was repeated except that the polymer microparticles (A) were replaced with polymer microparticles (B) obtained in Example 3. Polyether urethane acrylate resin (C) was obtained.

EXAMPLE 9

A one liter flask equipped with reflux-distillation means, stirring means and cooling means was charged with 200 parts of xylene, 200 parts of n-butanol and 50 parts of the aqueous dispersion of polymer microgel particles (C) obtained in Example 4. The mixture was subjected to azeotropic distillation under reduced pressure at 55° C. for 3 hours to remove water therefrom. To this were added 100 parts of an organopolysiloxane polymer consisting of 70 mole % of dimethylsiloxane units, 30 mole % of diphenylsiloxane units and terminal dimethylvinylsiloxane units and having a viscosity of 3,200 cps with stirring. Then solvent was distilled off in vacuo to obtain polyorganosiloxane resin (D) containing polymer microparticles.

EXAMPLE 10

A flask equipped with stirring means, a thermometer and a reflux condenser was charged with 36.5 parts of maleic anhydride, 10.5 parts of sebacic acid, 170 parts of long chain ($C_{20}$) aliphatic dicarboxylic acid (sold under the name of SB-20 by Okamura Seiyu Co., Ltd.) and 93 parts of ethylene glycol. The mixture was reacted at 180°-200° C. until an acid number of 10 was reached. After the mixture was cooled to 40° C., 74.2 parts of isophoronediisocyanate and 150 parts of n-butyl acetate were added with stirring followed by the addition of 0.5 parts of dibutyltin dilaurate, and then the temperature was raised to 80° C. The reaction mixture was allowed to stand at the same temperature for one hour and a mixture of 38.7 parts of 2-hydroxyethyl acrylate and 0.5 parts of hydroquinone was added dropwise over one hour. The mixture was allowed to stand at the same temperature for 3 hours and then subjected to distillation under reduced pressure to move n-butyl acetate. Polyester urethane acrylate resin (E) was thus prepared.

EXAMPLE 11

90 parts of polyether urethane acrylate resin (A) containing polymer microparticles obtained in Example 6, 10 parts of phenoxyethyl acrylate and 2 parts of benzoin methyl ether were thoroughly mixed for 30 minutes and then defoamed. A UV radiation curable coating composition was obtained.

Properties of Cured Film

The above composition was applied on a silica glass plate to a dry film thickness of 100 microns and then irradiated with UV light under the conditions set forth below.

A specimen for tensile testing was taken by stripping the film from the glass plate and tested at 20° C. and at 60° C. The specimen exhibited an initial Young's modulus of 0.61 kg/mm$^2$ and an elongation of 61% at 20° C., and an initial Young's modulus of 0.45 kg/mm$^2$ and an elongation of 54% at 60° C., respectively. The maximum film thickness against run in the vertical direction of this composition was 350 microns.

Conditions For Irradiation With UV Light

A high pressure mercury lamp (Nippon Storage Battery Co., Ltd., Model HI-20N, 80 W/cm, equipped with a reflector beam collector) was placed over a conveyer at a hight of 80 cm with its longitudinal axis being perpendicular to the moving direction of the conveyer. The coated sample was passed under the lamp at a speed of 5 m/minute.

Coating Test

A length of silica based glass fiber having a diameter of 100 microns was drawn from a preform, coated immediately with the above coating composition to a film thickness of 50 microns, and irradiated with UV light. A glass fiber having a primary coating layer containing polymer microparticles was obtained.

EXAMPLE 12

The procedure of Example 11 was repeated except that the polyether urethane acrylate resin (A) was replaced with the polyether urethane acrylate resin (C) obtained in Example 8.

The resulting cured film exhibited an initial Young's modulus of 0.65 kg/mm$^2$, an elongation of 120% and a refraction index of 1.518 at 20° C.

COMPARATIVE EXAMPLE 1

The procedure of Example 11 was repeated except that the polyether urethane acrylate resin (A) was replaced with the polyether urethane acrylate resin (B) free from polymer microparticles obtained in Example 7.

The resulting cured film exhibited an initial Young's modulus of 0.60 kg/mm$^2$ and an elongation of 48% at 20° C., and an initial Young's modulus of 0.58 kg/mm$^2$ and an elongation of 34% at 60° C., respectively. The refraction index of this film was 1.492.

The maximum film thickness against run in the vertical direction of this composition was 170 microns.

EXAMPLE 13

70 parts of an organopolysiloxane polymer consisting of 70 mole % of dimethylsiloxane units, 30 mole % of diphenylsiloxane units and terminal dimethylvinylsiloxane units and having a viscosity of 4,200 cps; an organopolysiloxane polymer consisting of 50 mole % of dimethylsiloxane units, 50 mole % of methylhydrogensiloxane units and terminal trimethylsiloxane units and having a viscosity of 15 cps; 0.2 parts of 1% isopropanol solution of chloroplatinic acid; and 30 parts of the polyorganosiloxane resin (D) obtained in Example 9 were thoroughly mixed and then defoamed. A thermosetting primary coating composition for optical fibers was obtained.

Properties of Cured Film

The above composition was applied on a silica glass plate to a dry film thickness of 100 microns and then heated at 180° C. for 20 minutes.

A specimen of the resulting cured film exhibited an initial Young's modulus of 0.25 kg/mm$^2$, an elongation of 120% and a hardness of 13.

Coating Test

A length of silica based glass fiber having a diameter of 200 microns was dipped in the above composition, pulled up vertically and baked in an oven at 450° C. for 4 seconds. A glass fiber having a primary coating layer was obtained.

EXAMPLE 14

100 parts of polyester urethane acrylate resin (E) obtained in Example 10, 20 parts of polymer microparticles (A) obtained in Example 2 and 2 parts of benzoin methyl ether were mixed with stirring for 60 minutes and then defoamed. A UV radiation curable coating composition was obtained.

A specimen of cured film of this composition was prepared and tested as in Example 11. The specimen exhibited an initial Young's modulus of 35 kg/mm$^2$ and an elongation of 65% at 20° C., and an initial Young's modulus of 20 kg/mm$^2$ and an elongation of 37% at 60° C., respectively.

The maximum film thickness against run in the vertical direction of this composition was 400 microns. The cured film exhibited an excellent water resistance.

This composition was applied over the coated glass fiber obtained in Example 11 and cured by irradiating with UV light to form a secondary coating layer.

A glass fiber having a double-layered coating film containing polymer microparticles was obtained.

COMPARATIVE EXAMPLE 2

The procedure of Example 14 was repeated except that the coating composition did not contain the polymer microparticles (A).

A specimen of cured film prepared from this composition exhibited an initial Young's modulus of 27 kg/mm$^2$ and an elongation of 54% at 20° C., and an initial Young's modulus of 16 kg/mm$^2$ and an elongation of 21% at 60° C., respectively.

EXAMPLE 15

100 parts of epoxy acrylate resin having an average molecular weight of 1,150 produced by reacting acrylic acid with EPIKOTE 1001 (bisphenol A diglycidyl ether epoxy resin sold by Shell Chemical, epoxy equivalent 470), 50 parts of 1,6-hexanediol diacrylate, 7 parts of trimethylolpropane triacrylate and 17 parts of polymer microparticles obtained in Example 5 were thoroughly mixed in a disperser and then defoamed. An electron beam curable coating composition was obtained.

A specimen of cured film was prepared from this composition by irradiating with an electron beam at an energy level of 300 KeV at an electron current of 30 mA until a dose of 3 Mrad was reached. This specimen exhibited an initial Young's modulus of 45 kg/mm$^2$ and an elongation of 21%. The film exhibited an excellent breaking strength and water resistance.

This composition was applied over the coated glass fiber obtained in Example 13 and cured by irradiating with an electron beam under the same conditions as above to form a secondary coating layer. A glass fiber having a double-layered coating film containing polymer microparticles was obtained.

COMPARATIVE EXAMPLE 3

The procedure of Example 15 was repeated except that the coating composition did not contain the polymer microparticles (D).

A specimen of cured film prepared from this composition exhibited an initial Young's modulus of 35 kg/mm² and an elongation of 11%.

EXAMPLE 16

500 parts of DAIAMID T470 (nylon 12 powder sold by Daicel Chemical Industries, Ltd.) and 50 parts of the polymer particles obtained in Example 4 were kneaded under heat and heated at 235° C. to give a molten mass.

The coated glass fiber having double layered coating film obtained in Example 15 was extrusion-coated with this molten mass and then cooled with water immediately.

A glass fiber having a three-layered protective coating film was obtained. The glass fiber exhibited a high flexibility and a high flexural strength.

We claim:

1. In an optical fiber surrounded by a protective coating film comprising a plurality of layers, the improvement wherein a primary layer of said coating film which is directly on the fiber surface comprises a continuous phase of a film-forming matrix resin and 0.02 to 20% by weight of said primary layer of polymer microparticles having a particle size from 0.01 to 6 microns uniformly dispersed in said matrix resin, thereby improving its Young's modulus and elongation over a wide temperature range as well as its peelability, said polymer microparticles consisting essentially of an internally cross-linked polymer of a mixture of ethylenically unsaturated monomers containing a monomer having at least two polymerizable sites per molecule or a combination of two monomers having mutually reactive groups.

2. The optical fiber as claimed in claim 1, wherein a secondary layer of said coating film, which covers said primary layer, also comprises a continuous phase of a second film-forming matrix resin and 0.02 to 20% by weight of said secondary layer of said polymer microparticles uniformly dispersed in said second matrix resin, thereby improving its toughness and elongation over a wide temperature range.

3. The optical fiber as claimed in claim 1, wherein said matrix resin is a thermosetting resin.

4. The optical fiber as claimed in claim 1, wherein said matrix resin is a radiation curable resin.

5. The optical fiber as claimed in claim 3, wherein said matrix resin is a silicone resin.

6. The optical fiber as claimed in claim 4, said matrix resin is selected from the group consisting of unsaturated polyester resin, urethane acrylate resin, epoxy acrylate resin, polyester acrylate resin, spirane acrylate resin, polyether acrylate resin, silicon acrylate resin, polybutadiene acrylate resin and vinyl acrylate resin.

7. The optical fiber as claimed in claim 1, wherein said polymer microparticles are prepared by a polymerization method selected from the group consisting of emulsion polymerization, non-aqueous dispersion polymerization, precipitation polymerization and suspension polymerization.

8. The optical fiber as claimed in claim 7, wherein said emulsion polymerization is carried out using an emulsifier containing ampho-ionic groups.

9. The optical fiber as claimed in claim 2, wherein said second matrix resin is a radiation curable resin.

10. The optical fiber as claimed in claim 9, wherein said radiation curable resin is a urethane acrylate resin or expoxy acrylate resin.

11. In an optical fiber surrounded by a protective coating film comprising a plurality of layers, the improvement wherein an outermost layer of said coating film comprises a continuous phase of a thermoplastic matrix resin and 0.02 to 20% by weight of said outermost layer of polymer microparticles having a particle size from 0.01 to 6 microns uniformly dispersed in said matrix resin, thereby improving the toughness and abrasion resistance of said outermost layer, said polymer microparticles consisting essentially of an internally cross-linked polymer of a mixture of ethylenically unsaturated polymerizable monomers containing a monomer having at least two polymerizable sites per molecule or a combination of two monomers having mutually reactive groups.

12. The optical fiber as claimed in claim 11, wherein said thermoplastic resin is selected from the group consisting of polyamide, polyethylene, polypropylene, polyester, polysulfone, acrylic resins, methacrylic resins, polyvinyl chloride, polyphenylene oxide, polyphenylene sulfide, fluorocarbon resins and blends of these polymers.

* * * * *